United States Patent
O'Connor et al.

(10) Patent No.: US 10,525,923 B2
(45) Date of Patent: Jan. 7, 2020

(54) BELT LOAD MODULATION FOR VEHICLE FRONT OBLIQUE IMPACTS

(71) Applicant: Ford Global Technologies, LLC, Dearborn, MI (US)

(72) Inventors: Christopher Stephen O'Connor, Livonia, MI (US); Jacob Wookeun Lee, Novi, MI (US); Elizabeth G. Owen, Saline, MI (US); Keith Trudgeon, Beverly Hills, MI (US); Jamel E. Belwafa, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 174 days.

(21) Appl. No.: 15/699,480

(22) Filed: Sep. 8, 2017

(65) Prior Publication Data

US 2019/0077354 A1    Mar. 14, 2019

(51) Int. Cl.
*B60R 22/34* (2006.01)
*B60R 21/01* (2006.01)
*B60R 22/28* (2006.01)
*B60R 21/0136* (2006.01)
(Continued)

(52) U.S. Cl.
CPC ...... *B60R 21/0136* (2013.01); *B60R 21/0132* (2013.01); *B60R 22/341* (2013.01); *B60R 2021/0009* (2013.01); *B60R 2021/01034* (2013.01); *B60R 2021/01279* (2013.01); *B60R 2022/288* (2013.01)

(58) Field of Classification Search
CPC .......... B60R 2021/0009; B60R 22/341; B60R 22/3413; B60R 2022/288; B60R 2022/289; B60R 2021/01279; B60R 22/4676
See application file for complete search history.

(56) References Cited

U.S. PATENT DOCUMENTS

| 5,533,756 A | 7/1996 | Dybro et al. |
| 5,785,269 A * | 7/1998 | Miller, III ........... B60R 22/3413 242/379.1 |

(Continued)

FOREIGN PATENT DOCUMENTS

| EP | 1031474 A2 | 8/2000 |
| JP | 2008126990 A | 6/2008 |
| JP | 2013103603 A | 5/2013 |

OTHER PUBLICATIONS

Brumbelow et al., "Effects of Seat Belt Load Limiters on Driver Fatalities in Frontal Crashes of Passenger Cars," dated Apr. 12, 2017, ML, Baker BC, Nolan JM. Proc. Int. Tech. Conf. Enhanced Safety Vehicles 2007; 2007: 12p.

*Primary Examiner* — Ruth Ilan
(74) *Attorney, Agent, or Firm* — Frank A. MacKenzie; Bejin Bieneman PLC

(57) ABSTRACT

A system includes a sensor, a controller, and a seatbelt retractor. The controller is programmed to receive a signal from the sensor indicating detection of a vehicle front oblique impact. The seatbelt retractor includes a load limiting mechanism selectively releasable from a high load mode to a low load mode. The controller is programmed to release the load limiting mechanism from the high load mode to the low load mode at a predetermined time in response to a signal from the sensor indicating a vehicle front oblique impact.

20 Claims, 8 Drawing Sheets

(51) Int. Cl.
*B60R 21/0132* (2006.01)
*B60R 21/00* (2006.01)

(56) References Cited

U.S. PATENT DOCUMENTS

| | | | |
|---|---|---|---|
| 6,513,616 B2 * | 2/2003 | Bacher | B60R 22/28 |
| | | | 180/268 |
| 6,616,081 B1 * | 9/2003 | Clute | B60R 22/3413 |
| | | | 242/379.1 |
| 6,648,260 B2 * | 11/2003 | Webber | B60R 22/3413 |
| | | | 242/379.1 |
| 7,025,297 B2 * | 4/2006 | Bell | B60R 22/3413 |
| | | | 242/379.1 |
| 7,240,924 B2 | 7/2007 | Kohlndorfer et al. | |
| 7,370,822 B2 | 5/2008 | Hiramatsu | |
| 7,431,333 B2 | 10/2008 | Brown et al. | |
| 7,469,928 B2 | 12/2008 | Clute | |
| 7,823,923 B2 * | 11/2010 | Dramlitsch | B60R 22/28 |
| | | | 180/268 |
| 8,220,735 B2 | 7/2012 | Wang et al. | |
| 8,262,133 B2 | 9/2012 | Usoro et al. | |
| 8,297,709 B2 * | 10/2012 | Hiramatsu | B60R 22/4676 |
| | | | 297/471 |
| 8,714,595 B2 * | 5/2014 | Heasman | B60R 22/4676 |
| | | | 280/733 |
| 8,814,074 B2 | 8/2014 | Moedinger et al. | |
| 9,499,116 B2 * | 11/2016 | Tada | B60R 21/01512 |
| 2004/0066027 A1 * | 4/2004 | Ingemarsson | B60R 21/0134 |
| | | | 280/805 |
| 2004/0113409 A1 * | 6/2004 | Ingemarsson | B60R 21/0134 |
| | | | 280/806 |
| 2004/0216939 A1 * | 11/2004 | Lorenz | B60R 21/015 |
| | | | 180/268 |
| 2005/0134101 A1 * | 6/2005 | Hiramatsu | B60R 22/341 |
| | | | 297/472 |
| 2005/0206152 A1 * | 9/2005 | Delventhal | B60R 21/01516 |
| | | | 280/805 |
| 2005/0224622 A1 * | 10/2005 | Zolkower | B60R 22/3413 |
| | | | 242/379.1 |
| 2006/0022077 A1 * | 2/2006 | Hiramatsu | B60R 22/3413 |
| | | | 242/381 |
| 2007/0228705 A1 * | 10/2007 | Rao | B60R 21/0134 |
| | | | 280/735 |
| 2008/0029633 A1 * | 2/2008 | Hiramatsu | B60R 22/3413 |
| | | | 242/379.1 |
| 2009/0085340 A1 * | 4/2009 | Harda | B60R 21/0134 |
| | | | 280/805 |
| 2009/0210115 A1 * | 8/2009 | Gombert | B60R 22/44 |
| | | | 701/45 |
| 2010/0155519 A1 * | 6/2010 | Moedinger | B60R 22/3413 |
| | | | 242/379.1 |
| 2010/0213302 A1 * | 8/2010 | Gray | B60R 22/4676 |
| | | | 242/374 |
| 2010/0243782 A1 * | 9/2010 | Biller | B60R 22/4676 |
| | | | 242/374 |
| 2011/0035117 A1 * | 2/2011 | Yamada | B60R 21/0132 |
| | | | 701/45 |
| 2016/0244021 A1 * | 8/2016 | Hiramatsu | B60R 22/4628 |
| 2018/0236971 A1 * | 8/2018 | Ohachi | B60R 22/28 |
| 2018/0281745 A1 * | 10/2018 | Gray | B60R 22/4676 |

* cited by examiner

BELT LOAD MODULATION FOR VEHICLE
// FRONT OBLIQUE IMPACTS

BACKGROUND

A seatbelt in a vehicle may be equipped with "load-limiting" features. During a collision, a retractor of the seatbelt may lock webbing of the seatbelt from further extension from the retractor, and load-limiting features permit some additional limited extension of the webbing when the force exerted on the webbing exceeds a load-limiting threshold. This additional extension of the webbing from the retractor limits the load applied by the webbing to the chest of an occupant to reduce the chest deflection.

Load limiting may be achieved through use of a torsion bar. As one example, in U.S. Pat. No. 7,240,924, the retractor can include a first torsion bar and a second torsion bar that are aligned coaxially. During an impact, the spool is selectively engageable with either the first torsion bar or with the second torsion bar. The second torsion bar absorbs a higher force than the first torsion bar, i.e., it takes a larger force to twist the second torsion bar compared to the first torsion bar. Accordingly, when the occupant is relatively heavy, the spool is engaged with the second torsion bar (i.e., in a high load mode), and when the occupant is relatively light, the spool is engaged with the second torsion bar (i.e., in a low load mode). The retractor includes a pyrotechnic device that engages the spool with the first torsion bar or the second torsion bar.

As another example, in U.S. Pat. No. 8,814,074, a retractor includes a torsion bar fixed to a spool. The torsion bar is selectively engageable with a deforming member, which is more easily deformable relative to the torsion bar. Accordingly, the torsion bar and the deforming member can be connected in parallel for when an occupant of the seat is relative heavy (i.e., in a high load mode), and can be connected in series when the occupant of the seat is relatively light (i.e., in a low load mode).

As another example, in U.S. Pat. No. 8,220,735, the retractor includes a torsion bar with two segments and a pretensioner activatable to switch between a high load mode and a low load mode. The first segment of torsion bar may be engaged by default, and the pretensioner may ignite a charge to engage the second segment of the torsion bar.

As another example, in U.S. Pat. No. 7,370,822, the retractor includes a brake system engageable with two torsion bars. In this situation, the brake system may be engageable with each torsion bar separately to prevent rotation of the torsion bar, i.e., to set a load limiting level. In other words, the brake system may engage both torsion bars, one of the torsion bars, or neither torsion bar to meet the load limiting requirements.

DETAILED DESCRIPTION

Figure 1:
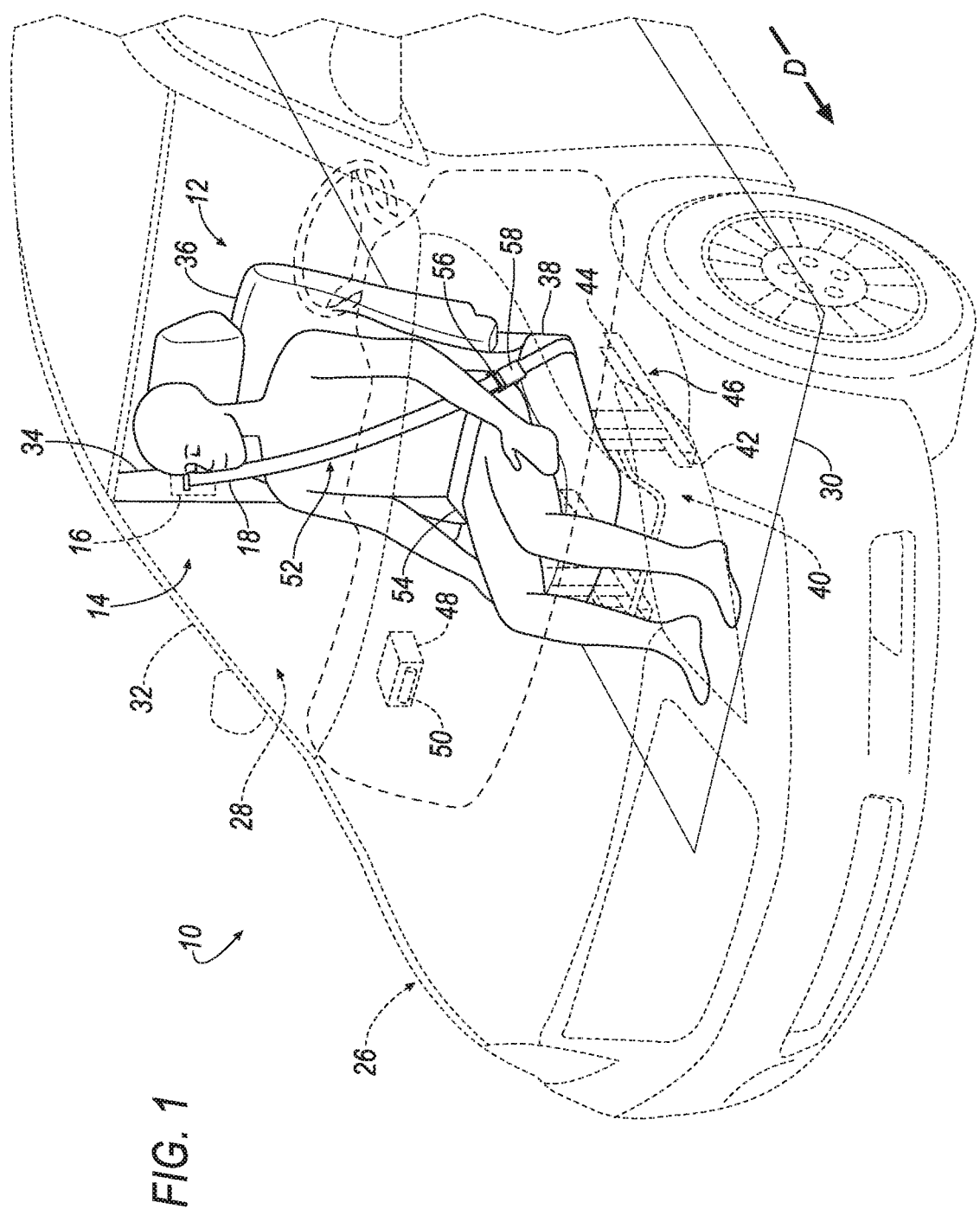
FIG. 1 is a perspective view of a vehicle including a vehicle seat and a system having a seat belt retractor and webbing.

A system includes a sensor, a controller programmed to receive a signal from the sensor indicating detection of a vehicle front oblique impact, and a seatbelt retractor including a load limiting mechanism selectively releasable from a high load mode to a low lode mode. The controller is programmed to release the load limiting mechanism from the high load mode to the low load mode at a predetermined time in response to a signal from the sensor indicating a vehicle front oblique impact.

The system may include a webbing retractable from the seatbelt retractor. The webbing may be engaged with the load limiting mechanism.

The seatbelt retractor may exert a force on the webbing that opposes webbing payout during a vehicle front oblique impact. The load limiting mechanism may prevent the force of the seatbelt retractor on the webbing from exceeding a high load limit. The predetermined time may be based on the force of the seatbelt retractor reaching the high load limit.

The load limiting mechanism may be locked in the high load mode during a frontal impact.

The predetermined time may be based on the sensor detecting a vehicle front oblique impact.

When the load limiting mechanism is released from the high load mode to the low load mode, the load limiting mechanism may prevent the force of the seatbelt retractor on the webbing from exceeding a low load limit. The low load limit may be less than the high load limit.

The load limiting mechanism may release from the high load mode to the low load mode during a step time. The step time may include a start time and a finish time. The start time of the step time may be at the predetermined time. The finish time of the step time may be at the predetermined time. The finish time of the step time may be after the predetermined time.

The load limiting mechanism may include a pyrotechnic device. The pyrotechnic device may release the load limiting mechanism from the high load mode to the low load mode in response to a signal from the sensor indicating a vehicle front oblique impact.

The system may include an airbag inflatable to an inflated position. The predetermined time may be based on an initiation of inflation of the airbag. The predetermined time may occur when an occupant impacts the airbag in the inflated position.

The system may include a component sensor. The controller may be programmed to receive a signal from the component sensor indicating an impact condition. The predetermined time may be determined based on receipt of the signal from the component sensor.

The system may include a seat moveable along a seat track to a plurality of positions. The component sensor may be a seat position sensor. The signal may be one position of the seat.

The component sensor may be an occupant classification sensor. The signal may be physical characteristics of an occupant in the seat.

The component sensor may be a seatbelt payout sensor. The signal may be an amount of payout of the webbing from the seatbelt retractor.

The component sensor may be an accelerometer. The signal may be an acceleration of the vehicle.

With reference to the Figures, wherein like numerals indicate like parts throughout the several views, a vehicle 10 is generally shown. The vehicle 10 includes a seat 12 and a system 14 having a seatbelt retractor 16 and a webbing 18 retractable from the seatbelt retractor 16. During a vehicle impact, the momentum of an occupant biases the occupant relative to the seat 12. For example, in a vehicle front oblique impact, the momentum of the occupant may bias the occupant away from the seat 12 oblique to a vehicle-fore-and-aft direction D, i.e., bias the occupant in both the vehicle-fore-and-aft direction D and a cross-vehicle direction. In other words, a "vehicle front oblique impact," is a frontal impact of the vehicle 10 at an angle relative to the longitudinal axis of the vehicle 10.

When the occupant moves away from the seat 12 during the vehicle front oblique impact, the system 14, e.g., the webbing 18, may exert a force on the occupant to retain the occupant on the seat 12. During the vehicle front oblique impact, the seatbelt retractor 16 may be releasable to allow for load-limiting when the system 14 retains the occupant on the seat 12. Specifically, the seatbelt retractor 16 may release to give an additional payout of the webbing 18 of the system 14 to reduce rotational velocity of the occupant during the vehicle front oblique impact, and specifically, to reduce the rotational velocity of the head of the occupant. During this release, the system 14 may reduce the force exerted on the occupant by the webbing 18, which may reduce the rotational velocity of the occupant.

The system 14 includes at least one sensor 20 and a controller 22 programmed to receive a signal from the sensor 20 indicating the vehicle front oblique impact. The seatbelt retractor 16 includes a load limiting mechanism 24 selectively releasable from a high load mode to a low load mode. In the high load mode, the load limiting mechanism 24 allows webbing payout from the seatbelt retractor 16 at relatively high loads applied to the webbing 18 by an occupant during a vehicle front oblique impact, and prevents webbing payout at relatively low loads; in the low load mode, the load limiting mechanism 24 allows for webbing 18 payout from the seatbelt retractor 16 at relatively low loads applied to the webbing 18 by an occupant during a vehicle front oblique impact.

The controller 22 is programmed to release the load limiting mechanism 24 from the high load mode to the low load mode at a predetermined time $T_p$ in response to the signal from the sensor 20 indicating the vehicle front oblique impact. During the vehicle front oblique impact, after receiving a signal from the controller 22, the load limiting mechanism 24 may release from the high load mode to the low load mode to allow additional payout of the webbing 18. The additional payout of the webbing 18 may allow the system 14, e.g., the webbing 18, to reduce the force exerted on the occupant and may reduce the rotation of the occupant, and specifically, the head of the occupant, during the vehicle front oblique impact. By reducing the rotation of the occupant, the system 14 may reduce the rotational velocity of a head of the occupant, which may reduce brain injury criteria (BrIC).

Additionally, the load limiting mechanism 24 limits movement of the occupant relative to the seat 12 more when the load limiting mechanism 24 is in the high load mode as compared to when the load limiting mechanism 24 is in the low load mode. In other words, the occupant is retained on the seat 12 more when the load limiting mechanism 24 is in the high load mode as compared to when the load limiting mechanism 24 is in the low load mode. When the load limiting mechanism 24 is in the high load mode, the webbing 18 may, for example, exert a higher force on the occupant as compared to when the load limiting mechanism 24 is in the low load mode, which may reduce movement of the occupant relative to the seat 12, e.g., towards vehicle components. By reducing the movement of the occupant away from the seat 12, the system 14 may reduce the likelihood of the occupant impacting vehicle components, e.g., an instrument panel, a steering wheel, an A-pillar, etc., which may reduce head injury criteria (HIC). Formula for HIC and BrIC are standardized by the National Highway Traffic Safety Administration (NHTSA).

With reference to FIG. 1, the vehicle 10 may, for example, be any suitable type of automobile. The vehicle 10 may include a vehicle body 26 defining a passenger cabin 28 to house occupants, if any, of the vehicle 10. The vehicle body 26 may include a floor 30 and a plurality of pillars 32, 34 extending in an upward direction from the floor 30. For example, the pillars 32, 34 may include an A-pillar 32 and a B-pillar 34 spaced from the A-pillar 32. The pillars 32, 34 may include additional pillars, e.g., a C-pillar (not shown).

One or more seats may be disposed at a front of the passenger cabin 28, e.g., between the A-pillar 32 and the B-pillar 34. In this situation, the seats 12 may be front seats. The passenger cabin 28 may include one or more rear seats (not shown) disposed behind the front seats. The passenger cabin 28 may also include third-row seats (not shown) at a rear (not numbered) of the passenger cabin 28, in which case the seats may be second-row seats (not numbered) instead of or in addition to being front seats. The passenger cabin 28 may include any suitable number of rows of seats, e.g., one or more rows of seats. As shown in FIG. 1, the seat 12 is a bucket seat, but the seats 12 may be other suitable types of seats, e.g., a bench seat.

The seats 12 may each include a seatback 36 and a seat bottom 38, as shown in FIG. 1. The seatback 36 may be supported by the seat bottom 38 and may extend upwardly from the seat bottom 38. The seatback 36 may be stationary or movable relative to the seat bottom 38. The seatback 36 and/or the seat bottom 38 may be adjustable in multiple degrees of freedom. Specifically, the seatback 36 and/or the seat bottom 38 may themselves be adjustable, in other words, may have adjustable components within themselves, and/or may be adjustable relative to each other.

With reference to FIG. 1, the seats 12 may be supported on the floor 30, i.e., directly on or through intermediate components. The seats 12, for example, may each be moveable along a seat track 40 that is fixed to the floor 30. For example, the seat bottom 38 may be slideably engaged with the seat track 40. The seat track 40 may be elongated in the vehicle-fore-and-aft direction D. The seat track 40 may include two ends 42, 44 spaced from each other in the vehicle-fore-and-aft direction D, and a mid-position 46 centered between the two ends 42, 44. In other words, the mid-position 46 may be spaced equally from the two ends 42, 44 along the seat track 40 in the vehicle-fore-and-aft direction D. The seats 12 may be moveable to a plurality of positions along the seat track 40, e.g., to the mid-position 46. In other words, the seats 12 may be disposed in any suitable position along the seat track 40 in the vehicle-fore-and-aft direction D. The seats 12 may be releasably fixed in position relative to the seat track 40 at a selected one of the plurality of positions in any suitable way. As another example, the seats 12 may be fixed to the floor 30 of the vehicle 10. In other words, the seat bottom 38 may be fixed to the floor 30. Additionally, or alternatively, the seats 12 may be moveable to a plurality of positions transverse to the vehicle-for-and-aft direction D, i.e., vertically relative to the floor 30 of the vehicle 10.

Figure 4A:
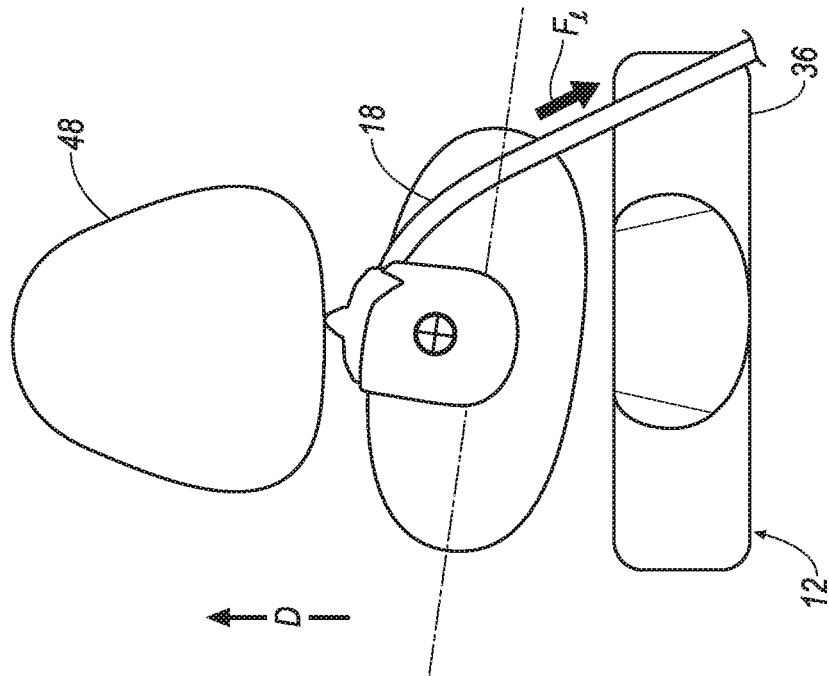
FIG. 4A is top view of the system including a load limiting mechanism engaged in a high load mode prior to an occupant impacting an airbag.
Figure 4B:
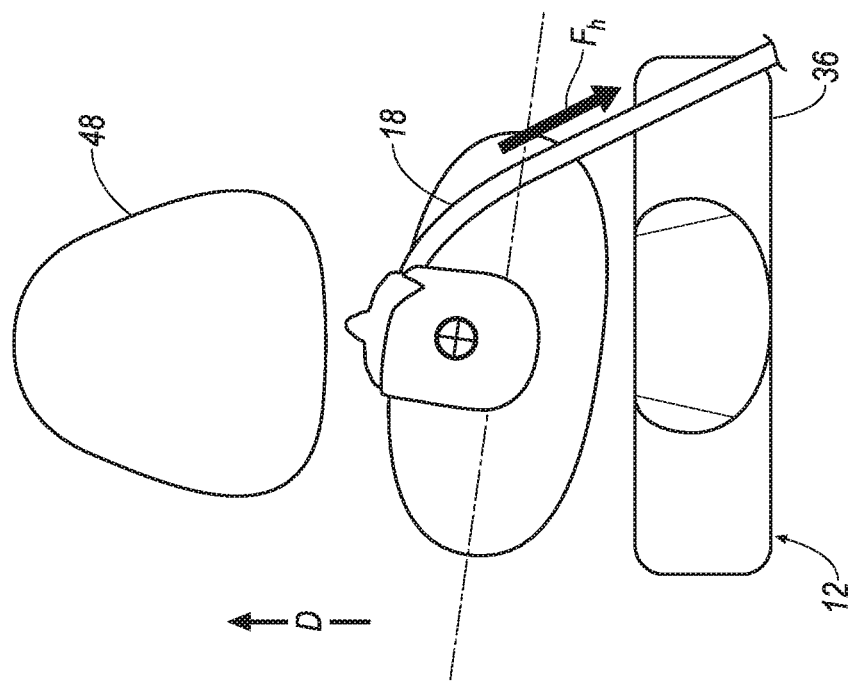
FIG. 4B is a top view of the system including the load limiting mechanism engaged in the low load mode when the occupant impacts the airbag.

The system 14 may include an airbag 48 spaced from the seat 12 in the vehicle-fore-and-aft direction D. The airbag 48 may be inflatable from an uninflated position, as shown in FIG. 1, to an inflated position, as shown in FIGS. 4A and 4B. During inflation, the airbag 48 may extend towards the seat 12, i.e., toward the occupant, along the vehicle-fore-and-aft direction D. In other words, the airbag 48 may inflate towards the seat 12 from the uninflated position to the inflated position. The airbag 48 may be supported by any suitable vehicle component, e.g., an instrument panel, a steering wheel, etc. As another example, where the seat 12 is a rear seat, the airbag 48 may be supported on a seatback 36 of a front seat.

The airbag 48 may be monolithic, e.g., a single piece of fabric. As another example, the airbag 48 may include a plurality of segments, i.e., two or more, that are separately formed and subsequently attached together. The segments may be attached to each other in any suitable fashion, e.g., stitching, ultrasonic welding, etc.

The airbag 48 may be formed of any suitable type of material or materials. The airbag 48 may be formed of any suitable airbag material, for example, a woven polymer. For example, the airbag 48 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIG. 1, an inflator 50 may be in fluid communication with the airbag 48 such that the inflator 50 inflates the airbag 48 from the uninflated position to the inflated position. The inflator 50 expands the airbag 48 with an inflation medium, such as a gas, to move the airbag 48 from the uninflated position to the inflated position. The inflator 50 may be disposed in any suitable location in the vehicle 10, e.g., in the instrument panel, on a steering wheel, etc.

Figure 2:
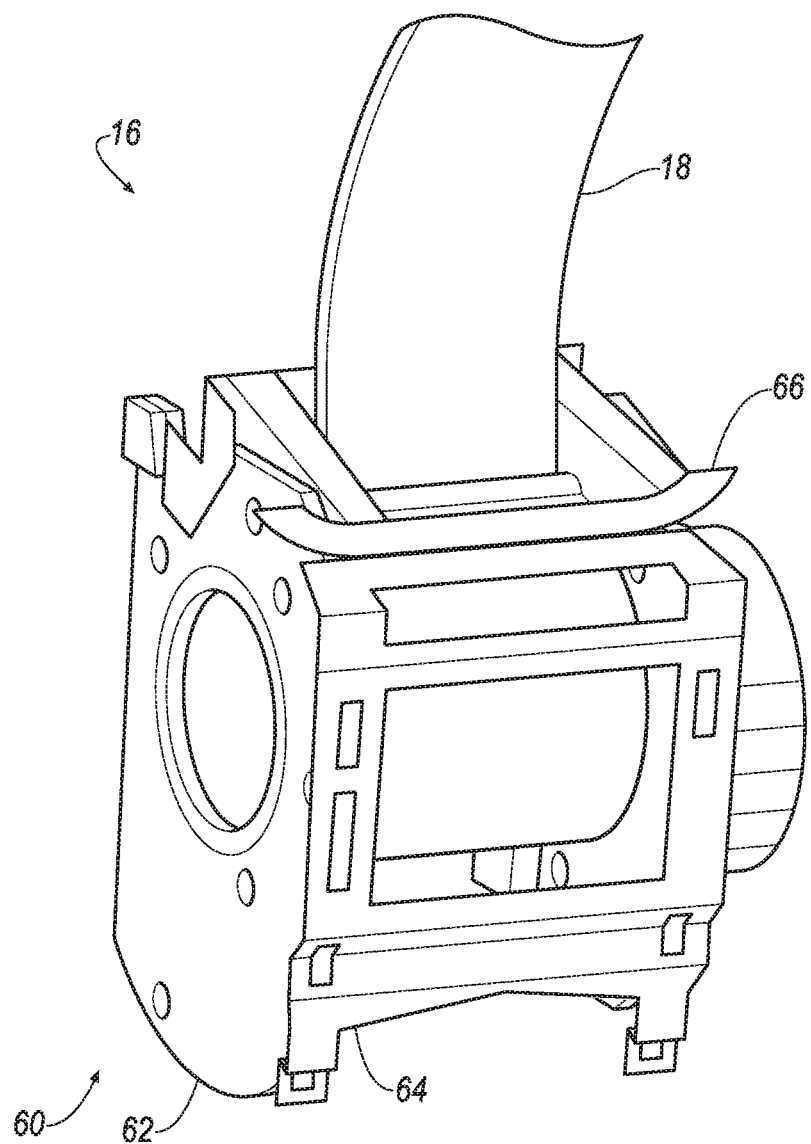
FIG. 2 is a perspective view of a seatbelt retractor of the system.

The system 14 may include a seatbelt assembly 52 having the seatbelt retractor 16 and the webbing 18 retractably payable from the seatbelt retractor 16, as shown in FIG. 2. Additionally, the seatbelt assembly 52 may include an anchor 54 coupled to the webbing 18, and a clip 56 that engages a buckle 58, as shown in FIG. 1. The seatbelt assembly 52 may be disposed adjacent the seat 12. For example, the seatbelt assembly 52 is adjacent the front seat, as shown in FIG. 1. The seatbelt assembly 52, when fastened, retains the occupant on the seat 12, e.g., during sudden decelerations of the vehicle 10.

The anchor 54 attaches one end of the webbing 18 to the seat 12. The other end of the webbing 18 feeds into the seatbelt retractor 16. The clip 56 slides freely along the webbing 18 and, when engaged with the buckle 58, divides the webbing 18 into a lap band and a shoulder band.

The seatbelt assembly 52 may be a three-point harness, as shown in FIG. 1, meaning that the webbing 18 is attached at three points around the occupant when fastened: the anchor 54, the seatbelt retractor 16, and the buckle 58. The seatbelt assembly 52 may, alternatively, include another arrangement of attachment points.

The seatbelt retractor 16 may include a housing 60 having a housing body 62 and a housing cover 64 attached to the housing body 62, as shown in FIG. 2. The housing 60 may be formed of metal or plastic. A webbing guide 66 may be attached to the housing 60. The housing 60 may be mounted to the vehicle body 26. For example, the housing 60 may be attached to the B-pillar 34, as shown in FIG. 1. As another example, when the seatbelt assembly 52 is adjacent the rear seat, the housing 60 may be attached to the C-pillar. Alternatively, the housing 60 may be attached to the front seat, e.g., a frame (not shown) of the front seat. The housing 60 may be attached to the vehicle body 26 in any suitable manner, e.g., fasteners.

The seatbelt retractor 16 may be engageable from an unlocked position to a locked position. The seatbelt retractor 16 is in the unlocked position by default, i.e., in the absence of a sudden deceleration. In the unlocked position, a spool 68 is rotatable within the housing 60 to allow the webbing 18 to be extended from and retracted into the seatbelt retractor 16. The seatbelt retractor 16 may change from the unlocked position to the locked position during a sudden deceleration of the vehicle 10, i.e., deceleration triggers components of the seatbelt retractor 16 to change from the unlocked position to the locked position. For example, the seatbelt retractor 16 may change from the unlocked position to the locked position in response to the vehicle impact. In the locked position, the seatbelt retractor 16 exerts a force (not shown) on the webbing 18 opposing webbing 18 payout during the vehicle front oblique impact. In this situation, one end of the spool 68 is rotationally locked relative to the housing 60, which stops the extension of the webbing 18 from the seatbelt retractor 16 to limit forward movement of the occupant.

Figure 3:
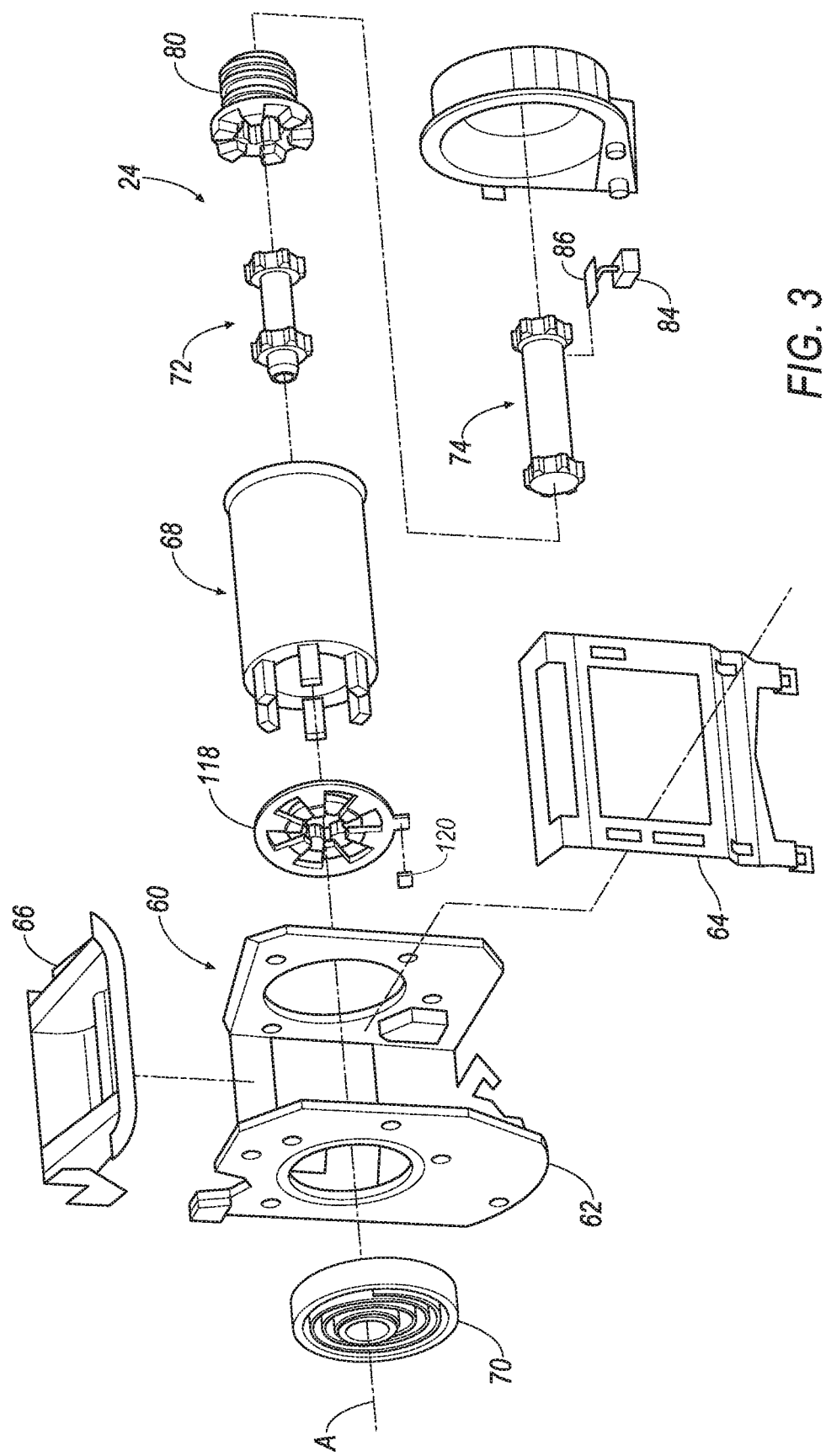
FIG. 3 is an exploded view of the seatbelt retractor of the system.

With reference to FIG. 3, the spool 68 of the seat belt retractor 16 is rotatably coupled to the housing 60. The spool 68 may freely rotate relative to the housing 60. The spool 68 may be cylindrical in shape. The spool 68 may define an axis of rotation A about which the spool 68 rotates. The spool 68 may be adapted to receive the webbing 18, for example, by including a webbing attachment slot (not shown) and permitting the webbing 18 to wind around the spool 68.

With continued reference to FIG. 3, a spool spring 70 may be coupled to the spool 68 and the housing 60. The spool spring 70 may be loaded in tension or compression when the webbing 18 is fully retracted, and the spool spring 70 may be further loaded in either tension or compression when the webbing 18 is extended from the spool 68. Thus, the spool spring 70 may exert a retracting force (not shown) tending to retract the webbing 18. The spool spring 70 may be a spiral torsion spring or any other suitable type of spring.

The webbing 18 is attached to the spool 68. Specifically, one end of the webbing 18 may be attached to the anchor 54, as set forth above, and the other end of the webbing 18 may be attached to the spool 68, with the webbing 18 wound around the spool 68 beginning at that end. The webbing 18 may be formed of fabric, e.g., nylon.

The webbing 18 is engaged with the load limiting mechanism 24. For example, when the seatbelt retractor 16 is in the locked position, the webbing 18 may exert a force on the load limiting mechanism 24 in response to the vehicle impact. In this situation, the load limiting mechanism 24 may prevent the webbing 18 from extending from, i.e., paying out of, the seatbelt retractor 16, as set forth further below. When load limiting mechanism 24 is in the high load mode, when the load from the occupant on the webbing 18 is relatively high, i.e., exceeds a high threshold, the load limiting mechanism 24 allows additional payout of the webbing 18. As set forth above, after the predetermined time $T_p$, the load limiting mechanism 24 is released to the low load mode, which allows for additional payout of the webbing 18 from the seatbelt retractor 16.

The load limiting mechanism 24 may be of any suitable type for selectively operating in either the high load mode or the low load mode. As one example, with reference to FIG. 3, the load limiting mechanism 24 may, for example, include a first torsion bar 72, a second torsion bar 74 extending coaxially with the first torsion bar 72, a torque tube 80 supporting both the first torsion bar 72 and the second torsion bar 74, and a shift collar 118 engageable with the first torsion bar 72. As set forth further below, the load limiting mechanism 24 may be operated in the high load mode to the low load mode by selectively loading the second torsion bar 74 or the first torsion bar 72, respectively.

One example of a load limiting mechanism 24 is shown in FIG. 3. Alternatively, the seatbelt retractor 16 may include any suitable type of load limiting mechanism 24 that is releasable from a high load mode to a low load mode.

With reference to FIG. 3, the seatbelt retractor 16 includes a pawl 86 selectively engageable with one end of the second torsion bar 74, and specifically, the pawl 86 engages the one end of the second torsion bar 74 in the locked position. The spool 68 is engageable with the other end of the second torsion bar 74 in the high load mode, and is alternatively engageable with the first torsion bar 72 in the low load mode. The second torsion bar 74 absorbs a higher force than the first torsion bar 72, which accounts for the load limiting mechanism 24 to be in the high load mode when the spool 68 is engaged with the second torsion bar 74 and to be in the low load mode when the spool 68 is engaged with the first torsion bar 72.

Specifically, with continued reference to FIG. 3. The pawl 86 is rotatable relative to the housing 60 and a weighted pendulum 84 fixed relative to the pawl 86. When the vehicle 10 is moving at a constant speed, accelerating, or decelerating gradually, the weight of the weighted pendulum 84 causes the pawl 86 to be disengaged with the second torsion bar 74, allowing the spool 68 to rotate relative to the housing 60, i.e., the seatbelt retractor 16 is in the unlocked position. In this situation, the spool 68 is engaged with the other end of the second torsion bar 74 in the high load mode. When the vehicle 10 suddenly decelerates, the momentum of the weighted pendulum 84 causes the pawl 86 to engage the one end of the second torsion bar 74, i.e., the seatbelt retractor 16 is in the locked position, in which the pawl 86 prevents the one end of the second torsion bar 74 from rotating about the axis of rotation A. In this situation, the load limiting mechanism 24 prevents the webbing 18 from rotating the spool 68 unless the webbing 18 exerts a force on the spool 68 exceeding a high load limit $F_h$, in which case the second torsion bar 74 twists, i.e., deforms to allow payout of the webbing 18. In other words, the load limiting mechanism 24 prevents the force of the seatbelt retractor 16 on the webbing 18, i.e., the force on the occupant by the webbing 18, from exceeding the high load limit $F_h$ when the load limiting mechanism 24 is in the high load mode, as shown in FIG. 4A. The load limiting mechanism 24 may be locked in the high load mode during a type of frontal impact other than a vehicle front oblique impact.

During a vehicle front oblique impact, components of the load limiting mechanism 24 move to engage the spool 68 with the first torsion bar 72 to move the load limiting mechanism 24 to the low load mode at the predetermined time $T_p$. Specifically, with reference to the example in FIG. 3, the shift collar 118 is moved to engage the first torsion bar 72 to transfer the force to the first torsion bar 72. In this situation, the load limiting mechanism 24 prevents the webbing 18 from rotating the spool 68 unless the webbing 18 exerts the force on the spool 68 exceeding a low load limit $F_l$. The first torsion bar 72 twists, i.e., deforms, when the force exceeds the low load limit $F_l$ to allow additional payout of the webbing 18. In other words, the load limiting mechanism 24 prevents the force of the seatbelt retractor 16 on the webbing 18, i.e., the force on the occupant by the webbing 18, from exceeding the low load limit $F_l$ when the load limiting mechanism 24 is in the low load mode, as shown in FIG. 4B. The low load limit $F_l$ is less than the high load limit $F_h$.

The load limiting mechanism 24 may include a pyrotechnic device 120 in communication with the controller 22. The pyrotechnic device 120 may release the load limiting mechanism 24 from the high load mode to the low load mode in response to a signal from the sensor 20 indicating the vehicle front oblique impact. After the sensor 20 detects a vehicle front oblique impact, the controller 22 may, for example, send a signal to the pyrotechnic device 120 to ignite a pyrotechnic charge, which results in the spool 68 engaging the first torsion bar 72. The pyrotechnic device 120 may, for example, ignite the pyrotechnic charge at the predetermined time $T_p$ to release the load limiting mechanism 24 from the high load mode to the low load mode. The pyrotechnic device 120 may be any suitable type of pyrotechnic device 120.

Figure 6:
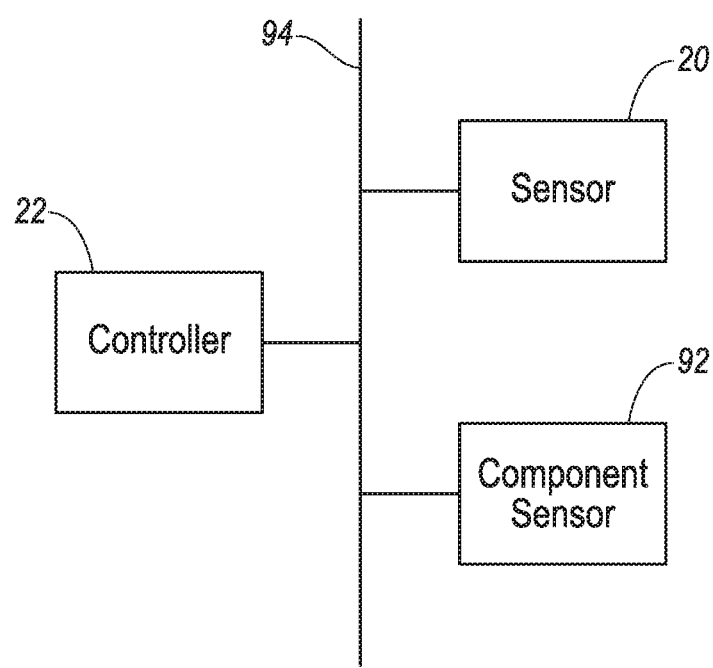
FIG. 6 is a block diagram of a control system for the system.

The system 14 may include a component sensor 92 in communication with the controller 22, as shown in FIG. 6. The component sensor 92 is adapted to detect an impact condition. The impact condition may be the position and movement of the occupant and/or the vehicle, e.g., the seat 12, the webbing 18, etc., during the vehicle front oblique impact. The component sensor 92 may be any suitable type of sensor, e.g., a camera, LIDAR, pressure sensors, etc. For example, the component sensor 92 may be a seat position sensor attached to any suitable vehicle component, e.g., the seat 12, the seat track 40, the instrument panel, the B-pillar 34, etc. The seat position sensor may be adapted to detect the position of the seat 12 on the seat track 40, e.g., relative to the airbag 48. As another example, the component sensor 92 may be an occupant classification sensor attached to any suitable vehicle component, e.g., the seat 12, the seat track 40, the instrument panel, the B-pillar 34, etc. The occupant classification sensor may be adapted to detect physical characteristics, e.g., height, weight, etc., of an occupant on the seat 12. In this situation, the occupant classification sensor may be adapted to detect the presence or absence of an occupant in the seat 12. As another example, the component sensor 92 may be a webbing payout sensor attached to one of the seatbelt retractor 16 and the webbing 18. The webbing payout sensor may be adapted to determine the amount of payout of the webbing 18 from the seatbelt retractor 16, i.e., the movement of the occupant away from the seat 12. As yet another example, the component sensor 92 may be an accelerometer. The accelerometer may be adapted to detect the acceleration of the vehicle. The accelerometer may be attached to any suitable vehicle component, e.g., the seat 12, an instrument panel, the B-pillar 34, etc. The system 14 may include any suitable number of component sensors 92.

Figure 5A:
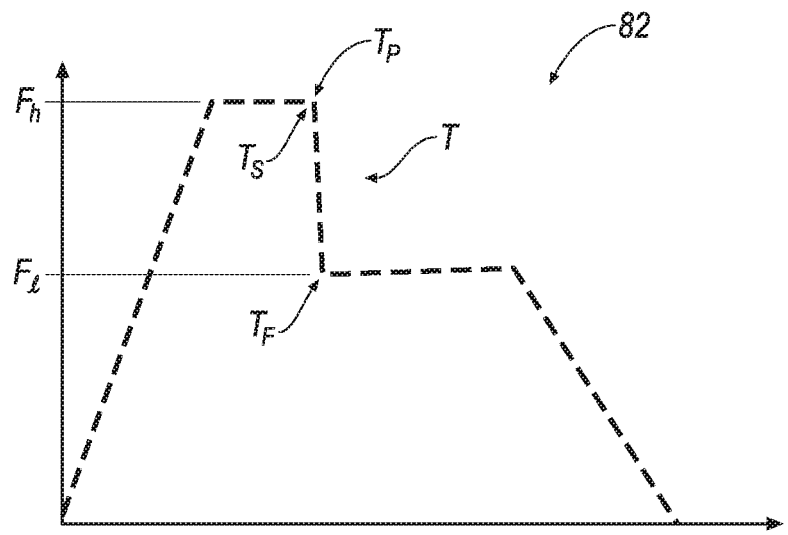
FIG. 5A is a graph of a step time when a load limiting mechanism releases a high load mode and substantially simultaneously engages a low load mode.
Figure 5B:
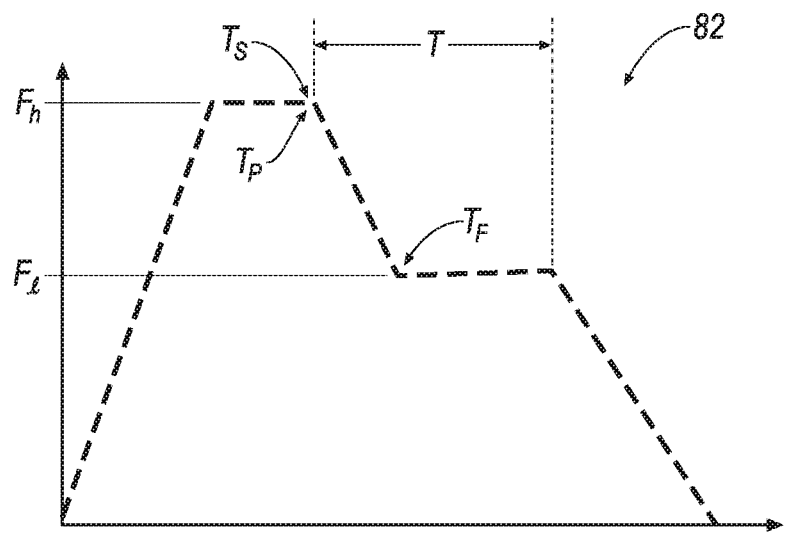
FIG. 5B is a graph of the step time when the load limiting mechanism releases from the high load mode and gradually engages the low load mode.
Figure 5C:
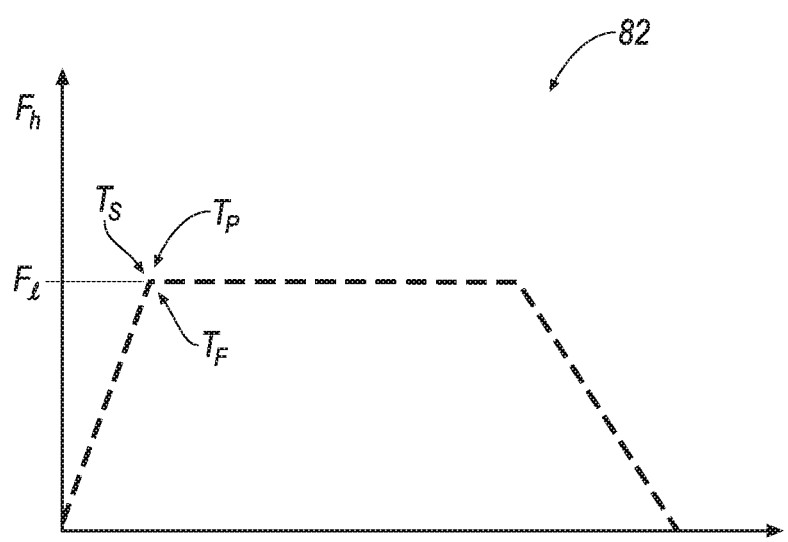
FIG. 5C is a graph of the step time when the load limiting mechanism releases from the high load mode prior to a force from the webbing reaching a high load limit.

With reference to FIGS. 5A-5C, the load limiting mechanism 24 may release from the high load mode to the low load mode during a step time T. The step time T may include a start time $T_s$ and a finish time $T_f$. The start time $T_s$ may occur at the predetermined time $T_p$. In other words, the load limiting mechanism 24 may begin to release to the low load at the predetermined time $T_p$.

FIGS. 5A-5C are graphs of a curve 82 describing the relationship between the step time T and the force exerted by the seatbelt retractor 16 on the webbing 18, i.e., one of the high load limit $F_h$ and the low load limit $F_l$. The finish time $T_f$ may occur at the predetermined time $T_p$. For example, the load limiting mechanism 24 may substantially simultaneously, i.e., at the same time, release from the high load mode and engage the low load mode at the predetermined time $T_p$, as shown in FIGS. 5A and 5C. Alternatively, the finish time $T_f$ may occur after the predetermined time $T_p$. In other words, the load limiting mechanism 24 may release from the high load mode and engage the low load mode at different times. For example, the load limiting mechanism 24 may gradually release from the high load mode to the low load mode, as shown in FIG. 5B. In other words, the load limiting mechanism 24 may be partially engaged in both the high load mode and the low load mode between the start time $T_s$, when the high load mode is engaged, to the finish time $T_f$, when the low load mode is engaged.

As set forth above, the load limiting mechanism 24 may be releasable from the high load mode to the low load mode at the predetermined time $T_p$. The predetermined time $T_p$ may be chosen such that the load limiting mechanism 24 will release from the high load mode to the low load mode during the vehicle front oblique impact when the occupant impacts the airbag 48 in the inflated position, as shown in FIGS. 4A and 4B. In other words, the predetermined time $T_p$ occurs when the occupant impacts the airbag 48 in the inflated position. The predetermined time $T_p$ may, for example, occur after the force of the seatbelt retractor 16 on the webbing 18 reaches the high load limit $F_h$, as shown in FIGS. 5A and 5B. Alternatively, the predetermined time $T_p$ may occur prior the force of the seatbelt retractor 16 on the webbing 18 reaching the high load limit $F_h$, as shown in FIG. 5C.

The predetermined time $T_p$ may be a fixed time after the vehicle front oblique impact, i.e., after the controller 22 receives a signal from the sensor 20 detecting the vehicle front oblique impact. For example, the predetermined time $T_p$ may be based on the sensor 20 detecting the vehicle front oblique impact. In other words, predetermined time $T_p$ may be a fixed time after the controller 22 receives a signal from the sensor 20 indicating the vehicle front oblique impact. As another example, the predetermined time $T_p$ may be based on initiation of inflation of the airbag 48, i.e., a fixed time after the initiation of inflation of the airbag 48. In this situation, the predetermined time $T_p$ may occur after the airbag activation time (i.e., the time between the vehicle front oblique impact and initiation of inflation of the airbag 48) and the time when the airbag 48 is fully deployed, i.e., is in the inflated position. As another example, the predetermined time $T_p$ may be based on the force of the seatbelt retractor 16 reaching the high load limit $F_h$, as shown in FIGS. 5A and 5B. In this situation, the predetermined time $T_p$ may be a fixed time after the force of the seatbelt retractor 16 reaches the high load limit $F_h$.

Additionally, or alternatively, the predetermined time $T_p$ may be based on the impact conditions detected during the vehicle front oblique impact by the component sensor 92. For example, the predetermined time $T_p$ may be based on the receipt of a signal from the component sensor 92. In this situation, the controller 22 may determine the predetermined time $T_p$, e.g., from a look-up table, based on the signal from the component sensor 92. The signal may, for example, be one position of the seat 12, the physical characteristics of the occupant in the seat 12, the acceleration of the vehicle 10, and/or the amount of payout of the webbing 18. For example, when the position of the seat 12 in front of the mid-position 46, i.e., between the one end 42 and the mid-position 46 on the seat track 40, the predetermined time $T_p$ occurs sooner as compared to when the position of the seat 12 is behind the mid-position 46, i.e., between the mid-position 46 and the other end 44 on the seat track 40. As another example, the predetermined time $T_p$ may, for example, occur after a predetermined payout of the webbing 18. As another example, when the physical characteristics of an occupant are relatively large, the predetermined time $T_p$ occurs sooner as compared to when the physical characteristics of the occupant are relatively small. As yet another example, when the acceleration of the vehicle 10 is relatively large, the predetermined time $T_p$ occurs sooner as compared to when the acceleration of the vehicle 10 is relatively small. The predetermined time $T_p$ may be based on any suitable number of impact conditions, i.e., a signal from one or more component sensors 92.

The controller 22 may be a microprocessor-based controller. The controller 22 may include a processor, memory, etc. The memory of the controller 22 may include memory for storing instructions executable by the processor as well as for electronically storing data and/or databases. The controller 22 may be a restraint control module (RCM), in other words, may be in communication with and may control airbags, pretensioners, etc. in the vehicle 10, among other functions.

The sensor 20 may be in communication with the controller 22, as shown in FIG. 6. The sensor 20 is adapted to detect an impact to the vehicle 10. Specifically, the sensor 20 is adapted to detect the vehicle front oblique impact. The sensor 20 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, charge-coupled device (CCD) image sensors, complementary metal-oxide-semiconductor (CMOS) image sensors, etc. The sensor 20 may be located at numerous points in or on the vehicle 10.

The controller 22 may transmit and receive signals through a communications network 94 such as a controller area network (CAN) bus, Ethernet, Local Interconnect Network (LIN), and/or by any other wired or wireless communications network. The controller 22 may be in communication with the sensor 20 and the component sensor 92 via the communications network 94, as shown in FIG. 6.

Figure 7:
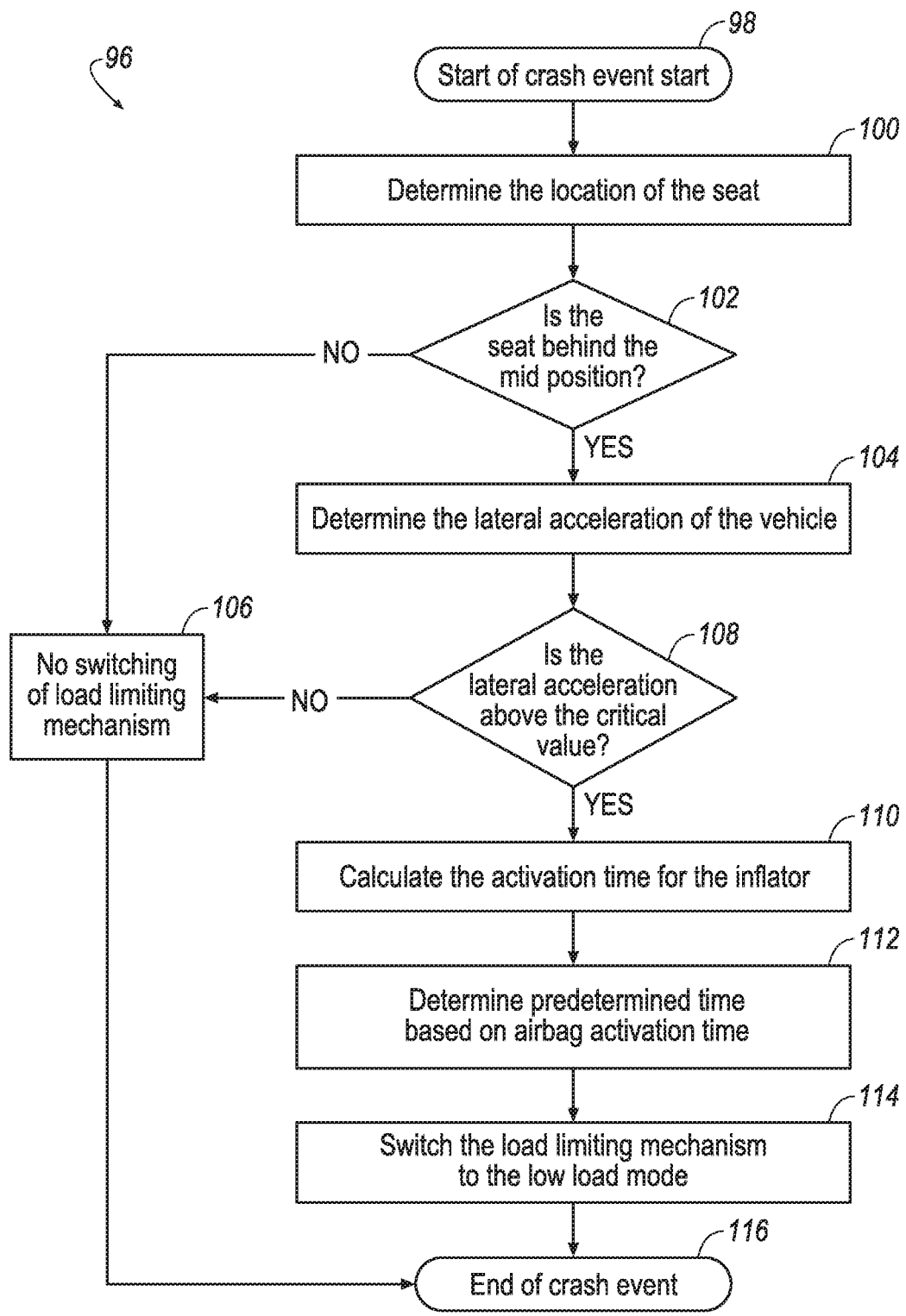
FIG. 7 is a flow diagram showing the steps of a method to selectively release a load limiting mechanism from the high load mode to the low load mode.

With reference to FIG. 7, a method 96 for selectively releasing the load limiting mechanism 24 from the high load mode to the low load mode is shown. As shown in block 98, the method 96 includes identifying the start of the crash event. For example, the method 96 may detect the vehicle impact, e.g., a frontal impact, a vehicle front oblique impact, etc. The sensor 20 may detect the impact and transmit a signal through the communications network 94 to the controller 22. Substantially simultaneously, the occupant of the seat 12 has momentum relative to the seat 12 and exerts a tensile force on the webbing 18. In this situation, the seatbelt retractor 16 is engaged to the locked position and the spool 68 is engaged with the other end of the second torsion bar 74, i.e., in the high load mode. The load limiting mechanism 24 in the high load mode may prevent the momentum of the occupant from freely paying out the webbing 18. In this situation, the second torsion bar 74 may resist the torque on the spool 68.

As shown in block 100, the method 96 includes determining the location of the seat 12. Specifically, the method 96 includes determining the location of the seat 12 on the seat track 40. The seat position sensor, i.e., the component sensor 92, may detect the seat 12 position and transmit a signal through the communications network 94 to the controller 22. For example, the seat 12 may be positioned at and/or in front of the mid-position 46, i.e., between the mid-position 46 and one end 42 of the seat track 40. Alternatively, the seat 12 may be positioned behind the mid-position 46, i.e., between the mid-position 46 and the other end 44 of the seat track 40.

As shown in block 102, the method 96 may include deciding whether the seat 12 is disposed behind the mid-position 46 or in front of the mid-position 46 on the seat track 40. When the seat 12 position is behind the mid-position 46, the method 96 proceeds to block 104. When the seat 12 position is in front of the mid-position 46, the method 96 proceeds to block 106.

As shown in block 104, the method 96 includes determining the lateral acceleration of the vehicle impact. The vehicle impact may, for example, include a lateral acceleration, i.e., directed transverse to the vehicle-fore-and-aft direction D. The sensor 20 may detect the lateral acceleration of the vehicle impact and transmit a signal to the controller 22.

As shown in decision block 108, the method 96 may include deciding whether the lateral acceleration is above or below a threshold value. In other words, the sensor 20 may detect the vehicle front oblique impact. The threshold value may be any suitable acceleration. For example, the threshold value may be the acceleration required to activate side impact restraint systems in the vehicle 10. When the lateral acceleration is below the threshold value, the method 96 proceeds to block 106. When the lateral acceleration is above the threshold value, the method 96 proceeds to block 110.

As shown in block 106, the method 96 includes preventing switching of the load limiting mechanism 24, e.g., releasing from the high load mode to the low load mode. In other words, the method 96 locks the load limiting mechanism 24 in the high load mode. For example, the controller 22 may send a signal to the load limiting mechanism 24 to remain engaged in the high load mode, e.g., to prevent the pyrotechnic device 120 from igniting. In this situation, the load limiting mechanism 24 remains in the high load mode until the vehicle impact is complete, as shown in block 116.

As shown in block 110, the method 96 includes calculating the airbag activation time for the inflator 50. The inflator 50 may be in communication with the controller 22 such that the inflator 50 initiates the airbag 48 inflation after the controller 22 transmits a signal to the inflator 50 indicating the vehicle impact. The controller 22 may initiate the inflator 50 to inflate the airbag 48 at the airbag activation time after the vehicle impact. The activation time may be fixed or dependent on conditions of the vehicle impact, e.g., a force, a direction, etc.

As shown in block 112, the method 96 includes determining the predetermined time $T_p$. The predetermined time $T_p$ may be based on the airbag activation time. In other words, the predetermined time $T_p$ may occur after the initiation of inflation of the airbag 48. Specifically, the predetermined time $T_p$ may be after the time for the airbag 48 to fully deploy, as set forth above. The predetermined time $T_p$ occurs when the occupant impacts the airbag 48 in the inflated position. In this situation, the load limiting mechanism 24 is released from the high load mode to the low load mode when the occupant impacts the airbag 48, as shown in FIGS. 4A and 4B.

Additionally, or alternatively, the predetermined time $T_p$ may be determined based on the impact conditions detected by the one or more component sensors 92, e.g., the occupant classification sensor, the seatbelt payout sensor, the accelerometer, etc., as set forth above. For example, the controller 22 may select a predetermined time $T_p$ based on the signals received from the component sensors 92, i.e., the impact conditions. In other words, the controller 22 may have a plurality of predetermined times $T_p$ stored, e.g., in a look-up table, based on possible combinations of the impact conditions. In this situation, the controller 22 determines the predetermined time $T_p$ based on the impact conditions of the vehicle impact.

As shown in block 114, the method includes switching the load limiting mechanism 24 to the low load mode. In other words, the load limiting mechanism 24 releases from the high load mode to the low load mode. The load limiting mechanism 24 may release from the high load mode and engage the low load mode in any suitable step time T, e.g., substantially instantaneous, gradual, etc. The seatbelt assembly 52 may retain the occupant on the seat 12, i.e., limit the movement of the occupant relative to the seat 12, under the high load mode to prevent the occupant from impacting vehicle 10 components prior to the airbag 48 inflation.

During the vehicle front oblique impact, the occupant may be rotated based on the forces exerted on the occupant to restrain the occupant. For example, the force exerted by the webbing 18 onto the occupant limits movement of the occupant relative to the vehicle 10, e.g., the seat 12, and results in rotation of the occupant, especially of an upper body, due to the force of the webbing 18 being offset from the lateral centerline of the occupant. As another example, when the occupant, e.g., the head of the occupant, impacts the airbag 48, a force exerted by the airbag 48 on the occupant may result in rotation of the occupant. In this situation, the rotation of the occupant may be increased based on the lateral acceleration of the vehicle front oblique impact, i.e., the occupant may impact the airbag 48 at a more severe angle when the lateral acceleration of the vehicle front oblique impact is increased, which may increase rotation of the head of the occupant.

When the load limiting mechanism 24 is engaged in the high load mode, the movement of the occupant, especially of the head and chest, is reduced compared to when the load limiting mechanism 24 is engaged in the low load mode. When the load limiting mechanism 24 is released from the high load mode to the low load mode, the force required from the webbing 18 to rotate the spool 68 is reduced, allowing the spool 68 to rotate and the webbing 18 to pay out. In this situation, the rotational velocity of the occupant may be reduced compared to if the load limiting mechanism 24 remained in the high load mode for the complete crash event. Thus, in the event of the vehicle front oblique impact, the system 14 may allow additional payout of the webbing 18 at the predetermined time $T_p$ to reduce the rotational velocity of the occupant, especially the upper body. After releasing to the low load mode, the load limiting mechanism 24 may remain engaged in the low load mode until the crash event is complete, as shown in block 116.

In the example shown in FIG. 3, when the controller 22 transmits a signal to the load limiting mechanism 24 to release to the low load mode, the pyrotechnic device 120 initiates the release from the high load mode to the low load mode. In other words, the pyrotechnic device 120 causes the load limiting mechanism 24 to disengage from the high load mode and engage the low load mode. For example, the pyrotechnic device 120 moves the shift collar 118 engage the first torsion bar 72. In this situation, the force of the webbing 18 on the load limiting mechanism 24 is transferred to the first torsion bar 72, as set forth above.

As shown in block 116, the method includes identifying the end of the crash event. The end of the crash event may, for example, be when the vehicle 10 momentum and the occupant momentum cease following the vehicle impact. In other words, the crash event may terminate when the vehicle 10 and the occupant are stationary. In this situation, the system 14 may be reset, i.e., the load limiting mechanism 24 may engage to the high load mode, such that the sensor 20 may detect a subsequent vehicle impact and send a signal to the controller 22 to release the load limiting mechanism 24 to the low load mode.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   a sensor;
   a controller programmed to receive a signal from the sensor indicating detection of a lateral acceleration of a vehicle impact; and
   a seatbelt retractor including a load limiting mechanism selectively releasable from a high load mode to a low load mode;
   the controller is programmed to release the load limiting mechanism from the high load mode to the low load mode at a predetermined time in response to a signal from the sensor indicating a lateral acceleration of the vehicle impact is above a threshold value; and
   the controller is programmed to prevent switching of the load limiting mechanism from the high load mode to the low load mode in response to a signal from the sensor indicating a lateral acceleration of the vehicle impact is below the threshold value.

2. The system of claim 1, further comprising a webbing retractable from the seatbelt retractor, the webbing engaged with the load limiting mechanism.

3. The system of claim 2, wherein the seatbelt retractor exerts a force on the webbing that opposes webbing payout during a vehicle front oblique impact, and wherein the load limiting mechanism prevents the force of the seatbelt retractor on the webbing from exceeding a high load limit.

4. The system of claim 3, wherein when the load limiting mechanism is released from the high load mode to the low load mode, the load limiting mechanism prevents the force of the seatbelt retractor on the webbing from exceeding a low load limit, the low load limit being less than the high load limit.

5. The system of claim 3, wherein the predetermined time is based on the force of the seatbelt retractor reaching the high load limit.

6. The system of claim 3, wherein the predetermined time occurs prior to the force of the seatbelt retractor reaching the high load limit.

7. The system of claim 1, wherein the predetermined time is based on the sensor detecting a vehicle front oblique impact.

8. The system of claim 1, further comprising an airbag inflatable to an inflated position, and wherein the predetermined time is based on an initiation of inflation of the airbag.

9. The system of claim 1, further comprising an airbag inflatable to an inflated position, and wherein the predetermined time occurs when an occupant impacts the airbag in the inflated position.

10. The system of claim 1, further comprising a component sensor, the controller is programmed to receive a signal from the component sensor indicating an impact condition.

11. The system of claim 10, wherein the predetermined time is based on receipt of a signal from the component sensor.

12. The system of claim 11, further comprising a seat moveable along a seat track to a plurality of positions, and wherein the component sensor is a seat position sensor, the signal is one position of the seat.

13. The system of claim 11, further comprising a seat, and wherein the component sensor is an occupant classification sensor, the signal is a physical characteristic of an occupant in the seat.

14. The system of claim 11, further comprising a webbing retractable from the seatbelt retractor and wherein the component sensor is a webbing payout sensor, the signal is an amount of payout of the webbing from the seatbelt retractor.

15. The system of claim 11, wherein the component sensor is an accelerometer, the signal is an acceleration of the vehicle.

16. The system of claim 1, wherein the load limiting mechanism releases from the high load mode to the low load mode during a step time, the step time includes a start time and a finish time.

17. The system of claim 16, wherein the start time of the step time is at the predetermined time and the finish time of the step time is at the predetermined time.

18. The system of claim 16, wherein the start time of the step time is at the predetermined time and the finish time of the step time is after the predetermined time.

19. The system of claim 1, wherein the load limiting mechanism includes a pyrotechnic device, the pyrotechnic device releases the load limiting mechanism from the high load mode to the low load mode in response to a signal from the controller indicating a vehicle front oblique impact.

20. The system of claim 1, further comprising a seat position sensor and a seat moveable along a seat track, the seat track having a mid-position, and wherein the controller is programmed to prevent switching of the load limiting mechanism from the high load mode to the low load mode in response to a signal from the seat position sensor indicating the seat is in front of the mid-position on the seat track.

* * * * *